United States Patent [19]

Baier et al.

[11] 4,327,438
[45] Apr. 27, 1982

[54] RECEIVING CIRCUIT IN AN INTERFERENCE-SUPPRESSING COMMUNICATIONS SYSTEM COMPRISING NARROW-BAND CONVENTIONAL MESSAGE MODULATION AND ADDITIONAL PSEUDO-NOISE PHASE SHIFT KEYING

[75] Inventors: Paul W. Baier; Klaus Dostert; Madhukar Pandit; Reinhard Simons, all of Kaiserslautern, Fed. Rep. of Germany

[73] Assignee: Siemens Aktiengesellschaft, Berlin & Munich, Fed. Rep. of Germany

[21] Appl. No.: 102,644

[22] Filed: Dec. 12, 1979

[30] Foreign Application Priority Data

Dec. 19, 1978 [DE] Fed. Rep. of Germany ....... 2854832

[51] Int. Cl.$^3$ .............................................. H04L 7/00
[52] U.S. Cl. ......................................... 375/1; 375/115
[58] Field of Search ............... 370/11, 12, 107; 375/1, 375/2, 115, 109, 107, 52, 57; 455/26, 28, 30; 371/32

[56] References Cited

U.S. PATENT DOCUMENTS 3,718,766  2/1973  Stover ..................................... 370/11
3,723,878  3/1973  Miller ..................................... 455/30
4,123,718  10/1978  Lampert et al. ........................ 375/1

Primary Examiner—Benedict V. Safourek
Attorney, Agent, or Firm—Hill, Van Santen, Steadman, Chiara & Simpson

[57] ABSTRACT

A receiving circuit for an interference-suppressing communications system having a narrow-band conventional message modulation and additional pseudo-noise phase shift keying (PN-PSK), has a pseudo-random generator whose pseudo-random sequence is identical to the pseudo-random sequence provided by the system transmitter. The pseudo-random generator actuates a phase-shift keying element to cancel the phase shift modulation produced at the transmitter. A matched filter or correlation network for correlation of the pseudo-random sequence at the receiver with the pseudo-random sequence contained in the received signal is provided. The message modulation impairs the function of the matched filter or the correlation network. The degrading influence of message modulation is to be eliminated, at least, reduced. To this end, a demodulation circuit is provided which receives the entire received signal and the signal present after removal of the phase-shift keying to provide an input for the matched filter or correlation network. This signal only exhibits the pseudo-noise phase-shift keying contained in the received signal, but no longer has the message modulation.

7 Claims, 6 Drawing Figures

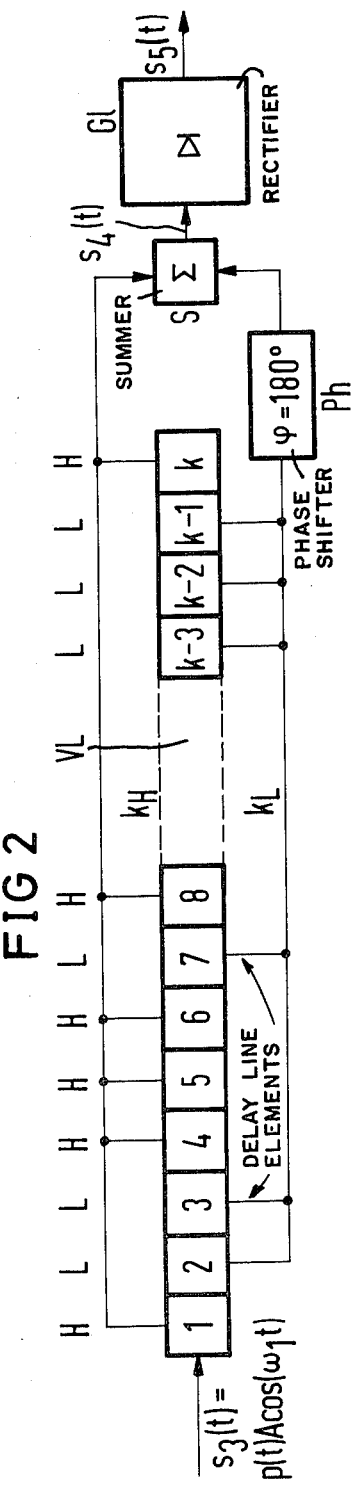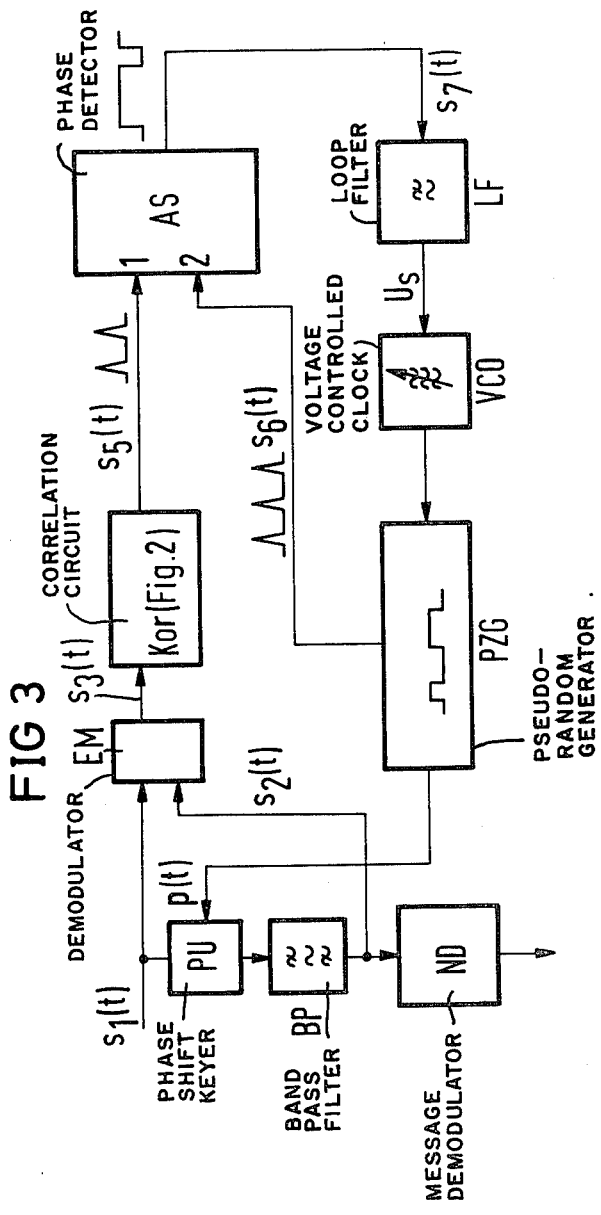
FIG 2
FIG 3

4,327,438

RECEIVING CIRCUIT IN AN INTERFERENCE-SUPPRESSING COMMUNICATIONS SYSTEM COMPRISING NARROW-BAND CONVENTIONAL MESSAGE MODULATION AND ADDITIONAL PSEUDO-NOISE PHASE SHIFT KEYING

BACKGROUND OF THE INVENTION

1. Field of the Invention

The present invention relates to a receiving circuit, provided in interference-suppressing communications system which comprises narrow-band conventional message modulation and additional pseudo-random phase shift keying (PN-PSK), in which the receiving circuit more specifically comprises a pseudo-random generator whose continuously repetitive pseudo-random sequence consists, in compliance with the transmittingside pseudo-random sequence, of an apparently random combination of the binary values L and H in a fixed clock pulse scheme and which actuates a phase keying which cancels the phase shift modulation produced at the transmitting side, and comprising a matched filter or correlation network, for example, a tapped delay device or a convolver for the purpose of producing a correlation pulse which always occurs when the pseudo-random sequence contained in the received signal reaches a specified location of the pseudo-random code, or when the correlation integral of the pseudo-random sequence contained in the received signal and of the pseudo-random sequence, produced at the receiving side, assumes a maximum.

2. Description of the Prior Art

Such interference-suppressing communications systems are described, for example, in the article of W. P. Baier: "Überlegungen zu störsicheren drahtlosen Nachrichtenübertragungs-systemen" in the publication "Siemens Forschungs-und Entwicklungs-Berichte", 4, 1975, pp. 61–67. Such interference-suppressing communications systems are based on a conventional communications system which employs, for example, analog frequency modulation, digital frequency modulation, or digital phase modulation. Through additional frequency or phase shifts in the rhythm of a rapid binary pseudo-random sequence, a considerable spread of the bandwidth is effected. Such communications systems are designated as spread-spectrum communications systems.

The signal at the receiver input of spread-spectrum communications systems comprising pseudo-random phase hop modulation has the form $$e(t) = \underbrace{A \cdot p(t) \cdot \cos[\omega_1 t + \phi(t)]}_{s_1(t)} + n_1(t) \quad (1)$$

The quantities occurring in equation (1) have the following significance:
A = Amplitude
$p(t)$ = Binary pseudo-random sequence $p(t) \in \{-1, 1\}$ with the clock pulse frequency $f_c$
t = Time
$\omega_1$ = Carrier angular frequency
$\phi(t)$ = In comparison with the clock frequency $f_c$ narrow-band analog or digital phase modulation or frequency modulation (message modulation)
$s_1(t)$ = Received desired signal, and
$n_1(t)$ = Received interfering signal.

The receiver-side processing of spread-spectrum signals according to equation (1) can proceed by means of matched filters. However, the obstacle presented in such a case is that the received desired signal $s_1(t)$ contains, in addition to the pseudo-random sequence $p(t)$, known in the receiver, a message modulation $\phi(t)$ not known a prior i in the receiver, so that the design of an exact matched filter is not possible.

A possibility of keeping the interfering influence of the message modulation on the function of the matched filter, or correlator, respectively, low, resides in the employment of a sufficiently narrow-band message modulation $\phi(t)$. However, this restricts the oossibility to design an optimum system with regard to interference suppression in the message channel.

Matched filters for signals having pseudo-noise phase shift keying can be realized, for example, with tapped delay lines for acoustic surface waves; cf. the article of D. T. Bell et al, "Application of Acoustic Surface-Wave Technology to Spread Spectrum Communications", in the publication "IEEE Transactions on Microwave Theory and Techniques", Vol. MTT-21 (1973), pp. 263–271. In the interest of as great an interference suppression as possible, the tapped delay line should have as great an overall delay time T as possible and, hence, as many taps as possible. On the other hand, with the overall delay time T, the degradation, brought about by a message modulation $\phi(t)$ of a given bandwidth, increases. With the bandwidth B of the signal cos $[\omega_1 t + \phi(t)]$, the maximum advantageous delay time is provided approximately by the relationship
ti $T \cong 1/B$. (2)

The interfering influence of message modulation can therefore also be maintained low by virtue of the fact that delay devices, or convolvers, respectively, are selected with a sufficiently small delay time. However, one is thereby restricted in the possibility of a system design which is as interference resistant as possible with regard to the receiver synchronization. In the case of an increase of the parameter T substantially beyond 1/B, no further gain in signal-to-noise ratio is achieved. To the contrary, the result is again a reduction of the signal-to-noise ratio. Only in the case of B=0; i.e., in the case of $\phi(t)=0$, would the signal-to-noise ratio improvement increase steadily with increasing T.

The restriction expressed by equation (2) would therefore be eliminated if no message modulation were contained in the received signal e(t); i.e. $\phi(t) = 0$. However, this is not realistic.

SUMMARY OF THE INVENTION

It is the object of the present invention, in an interference-suppressing spread-spectrum communications system, to eliminate at least, however, to decrease, the interfering influence of the message modulation on the matched filter, or the correlation network, respectively, so that one is no longer restricted in the possibility of an optimum system design with regard to the interference suppression in the message channel and in the selection of the delay time T.

According to the invention, the above object is achieved in that a demodulation circuit is provided to which is supplied the entire signal; i.e. the signal containing the message modulation and the pseudo-noise phase shift keying, on the one hand, and the signal present after phase keying; i.e., the signal containing only the message modulation, on the other hand, and from which a signal is taken for input into the matched filter, or the correlation network, respectively, which signal now only exhibits the pseudo-noise phase shift keying, contained in the received signal, but no longer the message modulation. The signal to be processed in the matched filter or in the correlation network, respectively, is therefore freed of the narrow band message modulation in advance. Delay times T which significantly exceed the value 1/B are then also advantageous. This is desirable in the interest of as great as possible an improvement of the signal-to-noise ratio through the matched filter, or through the correlation network, respectively.

BRIEF DESCRIPTION OF THE DRAWINGS

The invention, its organization, construction and operation will be best understood from the following detailed description, taken in conjunction with the accompanying drawings on which:

FIG. 2 is a schematic diagram of a correlation circuit having a tapped delay line, introduced in the case of a synchronization circuit for the receiver-side produced pseudo-random sequence;

FIG. 3 is a block circuit diagram of a complete receiver-side synchronization circuit comprising an installation for eliminating the message modulation in accordance with the present invention;

DESCRIPTION OF THE PREFERRED EMBODIMENTS

Figure 1:
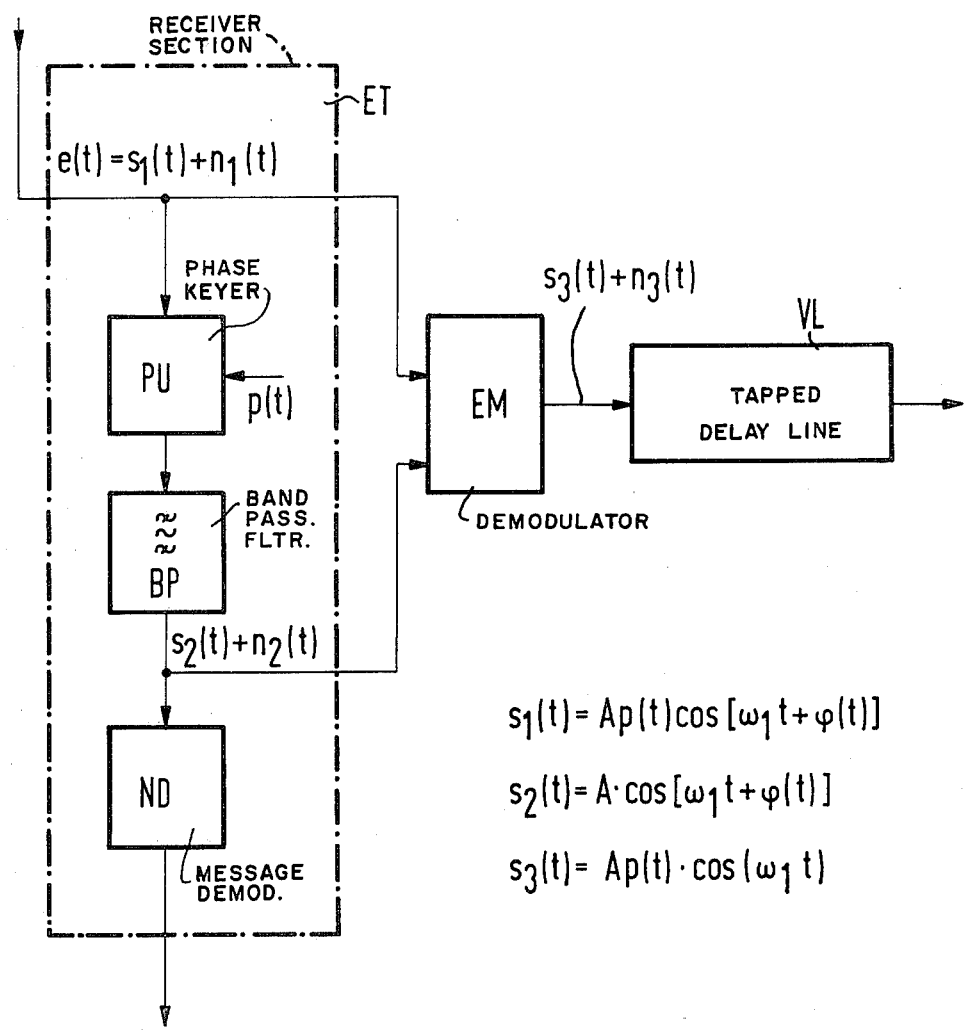
FIG. 1 is a basic block diagram of a PN-PSK receiver which includes an installation for eliminating the message modulation.

Referring to FIG. 1, the principle of the installation for eliminating the message modulation within the framework of a spread-spectrum receiver is illustrated for signals having pseudo-noise phase shift keying. The function of the receiver section ET, framed in broken lines, with a phase keying element PU, an interference suppression band pass filter BP, and a message demodulator ND is assumed as being known. In this regard, reference is made to the initially cited article of W. P. Baier. Initially, the interfering signal $n_1(t)$ and hence also the interfering signals $n_2(t)$ and $n_3(t)$ are assumed to be zero. Only the desired signals $s_1(t)$, $s_2(t)$ and $s_3(t)$ are assumed to be present.

The band-compressed output signal $s_2(t)$ of the interference suppression band pass filter BP now contains as modulation only the message modulation $\phi(t)$; however, it no longer contains the pseudo-noise phase shift keying provided by the function $p(t)$. For this reason, it is possible to produce, by means of a non-linear operation in the circuit referenced in the following with "demodular to" EM, from the signal $s_1(t)$ and $s_2(t)$, a signal of the form $$s_3(t) = A \cdot p(t) \cdot \cos(\omega_3 t). \tag{3}$$

The angular frequency $\omega_3$ is selectible depending upon the circuit design; for example, $\omega_3 = \omega_1$ can be obtained. The signal $s_3(t)$ now contains only the pseudo-noise phase shift keying; however, it no longer contains the message modulation $\phi(t)$. The signal $s_3(t)$ can therefore be processed in a tapped delay line VL of an arbitrarily large overall delay time T without a degradation occurring due to the message modulation $\phi(t)$. The output signal of the tapped delay line VL can be employed for synchronization of the local pseudo-random generator. Such synchronization devices are proposed in the German patent application No. P 27 42 696.6, now U.S. Pat. No. 4,214,209 and are explained in the following on the basis of FIGS. 2-5.

FIG. 2 schematically illustrates a tapped delay line VL including the additional required circuitry. The input signal $s_3(t)$ of the delay line has the carrier frequency $\phi_1/(2\pi)$ and the amplitude A. Its phase alternates in the rhythm of the binary, periodic pseudo-random sequence $p(t) \in \{1, -1\}$ between 0° and 180°. Therefore:

$$s_3(t) = p(t) \cdot A \cdot \cos(\omega_1 t). \tag{4}$$

The pseudo-random sequence $p(t)$ has the clock frequency $f_c = 1/T_c$. The delay line exhibits k taps in the "chronological" interval $T_c$. According to a section (the section, in the extreme instance, can also comprise the entire period of the pseudo-random sequence) of the length k of the sequence $p(t)$, a part $k_H$ of the output signals of the delay line VL is directly supplied to a summing circuit S, a part $k_L = k - k_H$, subsequent to a phase angle rotation of 180°, executed in a phase shifting circuit Ph, is fed to a summing circuit S. At its output, a signal $s_4(t)$ is available, which likewise exhibits the carrier frequency $\omega_1(2\pi)$. Generally, the amplitude of the signal $s_4(t)$ is relatively small. The signal $s_4(t)$ has a greater amplitude only when the phase shifts of the section of the signal $s_3(t)$, present at that time in the delay line VL, is matched to the section of the pseudo-random sequence programmed into the delay line VL, (in the illustrated instance HLLHHHLH...LLH). The maximum amplitude, in this case, ignoring the always-present insertion loss, is kA.

Figure 4:
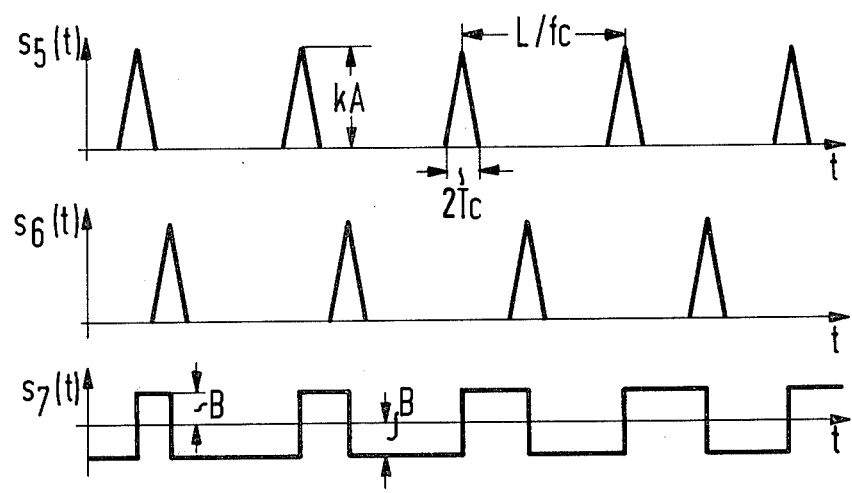
FIGS. 4 and 5 are graphic illustrations of the signal runs relating to the synchronization circuit.
Figure 5:
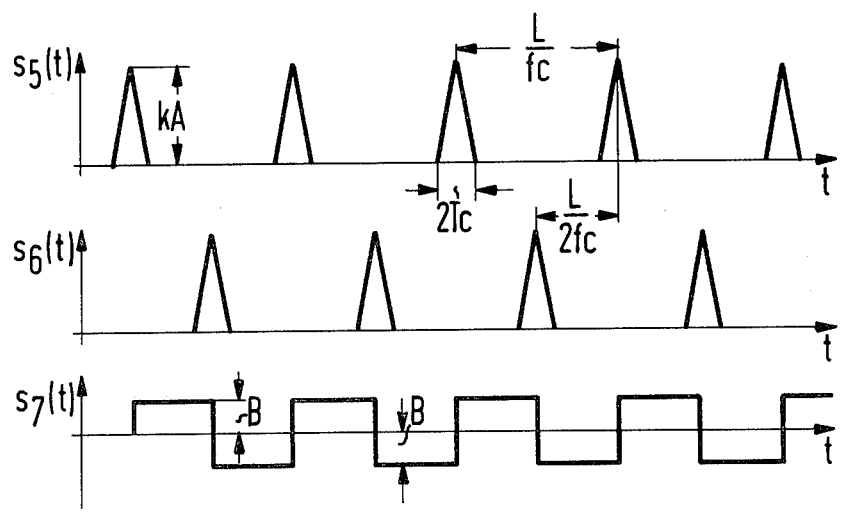

After a rectification of the signal $s_4(t)$ present at the summing output in a rectifier G1, the signal $s_5(t)$, illustrated in FIGS. 4 and 5 in the upper line, respectively, is obtained. The signal $s_5(t)$ runs periodically with the period $LT_c$, whereby L is the length of the pseudo-random sequence $p(t)$. The individual peak pulses of the signal $s_5(t)$ have a duration of approximately $2T_c$.

In the following, the block circuit diagram illustrated in FIG. 3, of a receiver-side synchronization circuit for PN-PSK signals with an installation for eliminating the message modulation is explained. The received signal without the interfering signal $n_1(t)$ is assumed to be $s_1(t)$ according to equation (1). The signal $s_1(t)$ is supplied to an input of a demodulator circuit EM. At a second input of the demodulator circuit EM, a signal $s_2(t)$ is provided from the interference suppression band pass filter BP by way of a phase shift keying element PU. The output signal $s_3(t)$ is supplied to a correlation circuit Kor, corresponding to the arrangement of FIG. 2, having a tapped delay line. At the output of the correlation circuit Kor, the periodic signal $s_5(t)$ according to FIGS. 4 and 5, upper line, respectively, is present. A pseudo-random generator PZG in the receiver, which is driven by clock pulses via a voltage-controlled clock pulse generator VCO, generates the same pseudo-random sequence as the transmitter side pseudo-random generator. Both pseudo-random sequences, however, generally have in the receiver a certain epoch difference ε, which is assumed to be the phase lead or lag of the pseudo-random sequence p(t) contained in the received signal s₁(t) in relation to the pseudo-random sequence, modulo $L/f_c$ generated in the receiver.

From the receiver-side pseudo-random generator PZG, a signal s₆(t) is derived which basically has the same progression as the signal s₅(t). The peaks of the signal s₆(t), however, always occur when, in the shift register stages of the pseudo-random generator PZG, there exists precisely at that time that section of the pseudo-random sequence generated in the receiver which differs by L/2 from the section programmed into the tapped delay line (VL in FIG. 2), where L is the length of the pseudo-random sequence p(t). If synchronism does not prevail (ε≠0), the signal s₅(t) and s₆(t) occur, as illustrated in FIG. 4, with a different period. In the case of synchronism (ε=0), the signals s₅(t) and s₆(t), by way of contrast, have the same period and the chronological assignment represented in FIG. 5. In this latter case, the peaks of the signals s₅(t) and s₆(t) occur alternately and chronologically at equal spacing. The chronological interval between adjacent peaks of the signals s₅(t) and s₆(t) then amounts to $L/(2f_c)$.

The signals s₅(t) and s₆(t) are, as FIG. 3 illustrates, supplied to the inputs 1 and 2, respectively, of a phase detector AS. The output signal s₇(t) of the phase detector AS, during occurrence of a peak of the signal s₅(t), shifts to the value s₇(t)=B (>0); and during the occurrence of a peak of the signal s₆(t), the output shifts to the value s₇(t)=−B. One then obtains the progressions of the signal s₇(t), illustrated in the lower line, respectively, in FIGS. 4 and 5, for the instances "non-synchronous" (ε≠0), or "synchronous" (ε=0). In the case of ε=0, the signal s₇(t) has the mean value zero. When an interferring signal n₁(t) is superposed on the received signal s₁(t), a threshold circuit must be provided in the phase detector AS for the signal s₅(t).

The d.c. voltage contained in the signal s₇(t) is used in order to adjust the frequency of the clock generator VCO such that first the state ε=0 is brought about and then also maintained. To this end, the signal s₇(t) is fed to the control input of the clock pulse generator VCO via a loop filter LF. The clock pulse generator VCO, in the case of disappearing control voltage $U_s$ is assumed to have the clock frequency $f_{VCO}=f_c$. Moreover, for example, it is assumed that $df_{VCO}/dU_s > 0$. Then the clock pulse generator VCO, in the case of an epoch difference $0<\epsilon<L/(2f_c)$, will have a clock pulse frequency $f_{VCO}>f_c$ until ε=0 has been reached. In the case of an epoch difference $L/(2f_c)<\epsilon<L/f_c$, $f_{VCO}<f_c$ will exist until ε=0 has likewise been reached. Subsequently, the control loop, consisting of the clock generator VCO, the pseudo random generator PZG, the phase detector AS and the loop filter LF, maintains the epoch difference at zero. In the case of a loss of synchronization, for example, due to a signal interruption, the circuit automatically executes a new acquisition operation.

After the epoch difference has been controlled to ε=0, in the phase shift keying element PU, which has been charged by the input signal s₁(t), it is possible with the pseudo-random sequence produced locally in the receiver to cause the phase shifts of the received signal s₁(t) to be canceled. The further signal processing in the receiver (ND=message demodulator) proceeds in a conventional manner.

The described receiving concept according to FIGS. 2-5 has the advantage that the acquisition, the maintenance of synchronism, and the renewed initiation of an acquisition operation after synchronization loss, are achieved by a single, relatively simple circuit. The interference immunity can be additionally increased by virtue of the fact that, after successful acquistion, the input 1 of the phase detector AS is activated only in those time intervals in which the peaks of the signal s₅(t) are to be expected.

Figure 6:
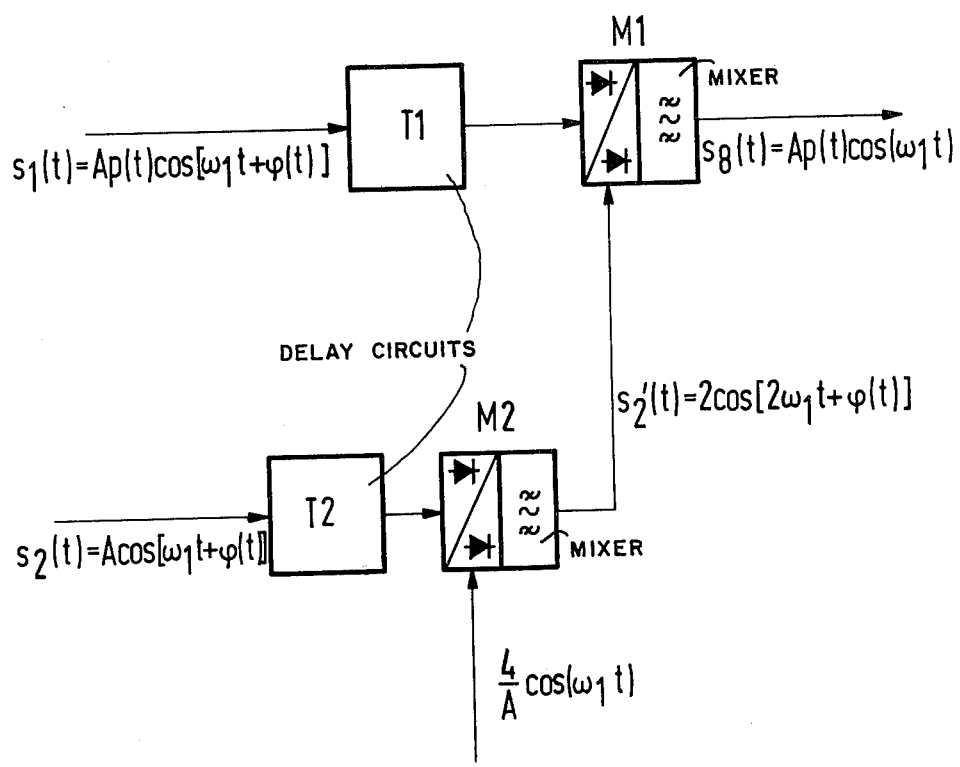
FIG. 6 is a schematic block diagram of an exemplary embodiment of the invention illustrating the elimination of the message modulation.

A possible embodiment of the circuit EM for demodulation is illustrated in FIG. 6. In order to equalize (or compensate) delay time differences, the two input signals s₁(t) and s₂(t) are first fed via the delay circuits T₁ and T₂. In a mixer M2 having an output connection to a band pass filter, from the signal s₂(t), the signal $$s_2'(t) = 2\cos[2\omega_1 t + \phi(t)] \tag{5}$$

is produced. In a mixer M1 with an output-connected band pass filter the signal s₂'(t) is mixed with the signal s₁(t) to form the signal $$s_3(t) = A \cdot p(t) \cdot \cos(\omega_1 t). \tag{4}$$

In this signal, the message modulation φ(t) is no longer contained, but only the pseudo-random phase shift keying. The signal s₃(t) is therefore suited for further processing in a matched filter on the basis of acoustic surface waves. It is of particular note that, through the measures set forth above, also degrading effects of the Doppler effect can be avoided.

In practice, one must proceed from the fact that there is superposed on the received signal s₁(t) an interfering signal n₁(t). The interfering signal n₁(t) effects the interfering signal n₂(t) at the output of the interference-suppression band pass filter BP. Since, in the demodulation circuit EM, the signals s₁(t)+n₁(t), as well as s₂(t)+n₂(t) interact with one another in a non-linear fashion, the signal-to-noise ratio γ₃ of the signal s₃(t)+n₃(t) is smaller than the signal-to-noise ratio γ₁ of the signal s₁(t)+n₁(t). The measure of "demodulation" is therefore connected with an additional degradation. The input signal of the tapped delay line VL is, indeed, freed of the message modulation; however, its signal-to-noise ratio is smaller than the signal-to-noise ratio of the signal e(t) at the input of the receiver. In the following, this degradation is to be evaluated.

The powers of the desired signals s₁,₂,₃ are designated with S₁,₂,₃; the powers of the noise signals n₁,₂,₃ with N₁,₂,₃. When the spread-spectrum receiver has the processing gain g, with a constant $k_a$, approximately $$S_2 = k_a \cdot S_1, \tag{6}$$

$$N_2 = k_a \cdot N_1 g \tag{7}$$

holds. Furthermore, with a constant $k_b$, approximately $$S_3 = k_b S_1 S_2, \tag{8}$$

$$N_3 = k_b(S_1 N_2 + S_2 N_1 + N_1 N_2) \tag{9}$$

holds.

From equation (8) and equation (9) one obtains, with equation (6) and equation (7)

$$S_3 = k_a k_b S^2_1, \tag{10}$$

$$N_3 = k_a k_b (S_1 N_1/g + S_1 N_1 + N^2{}_1/g). \tag{11}$$

With the signal-to-noise ratio $$\gamma_1 = S_1/N_1 \tag{12}$$

at the receiver input one obtains the signal-to-noise ratio $$\gamma_3 = \frac{S_3}{N_3} = \frac{S_1{}^2}{S_1 N_1/g + S_1 N_1 + N_1{}^2/g} = \gamma_1 \cdot \frac{1}{1 + \frac{1}{\gamma_1 g} + \frac{1}{g}} \tag{13}$$

at the output of the demodulator.

From equation (13) it follows that the degradation due to the demodulator circuit EM is negligible as long as:

(1) the processing gain is $g \gg 1$; and
(2) the signal-to-noise ratio $g \gamma_1$ at the output of the interference suppression b and pass filter is substantially greater than 1, $g \gamma_1 \gg 1$.

Both conditions are satisfied generally in the case of practical systems so that the additional degradation is insignificant.

For the function of the design concept according to FIG. 1, it is essential that the local pseudo-random sequence p(t) is available at one of the inputs of the phase shift keying element PU. The entire system must therefore be locked. If the output signal of the tapped delay line VL is necessary for the initiation of the synchronization of the system, transmission must first be carried out without messsage modulation $\phi(t)$; namely, until the synchronization has been successful. This requirement, in certain instances, must also be made in the case of other synchronization design concepts for spread-spectrum receivers.

As can be seen from FIG. 6, the mean frequency of the signal s₃(t) is independent of the instantaneous mean frequency of the received signal s₁(t) and always equal to $\omega_1/(2\pi)$. Therefore, the component EM is also suited for compensating possible frequency deviations of the received signal as a consequence of oscillator drift or Doppler effect.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a receiving circuit for an interference-suppressing communications system of the type having a narrow band conventional message modulation and additional pseudo-noise phase-shift keying, the receiving circuit comprising a pseudo-random generator whose continuous pseudo-random sequence conforms with the transmitting side pseudo-random sequence and consists of a pseudo-random combination of the binary values L and H in a fixed clock pulse scheme and which actuates a phase-shift keying element cancelling the phase shift modulation produced at the transmitting side, a correlation circuit for producing a correlation pulse which appears when the pseudo-random sequence of the received signal reaches a specified location of the pseudo-random code or when the correlation integral of the pseudo-random sequence of the received signal and the pseudo-random sequence produced at the receiving side reaches a maximum, the improvement therein comprising:

a demodulator connected to receive the entire message modulated and pseudo-random phase-shifted signal and to receive a signal which contains only the message modulated signal and providing a demodulated signal which contains only the pseudo-random phase-shift modulation to the correlation circuit.

2. The improved receiving circuit of claim 1, wherein said correlation circuit comprises:

a delay line including a plurality of taps, whose respective chronological interval corresponds to the reciprocal interval of the clock pulse frequency of the pseudo-random sequence; a 180° phase shifter; a summing circuit connected to a first portion of said taps directly and to a second portion of said taps via said 180° phase shifter, the program selection of said taps having the first and second portions corresponding to the binary values L and H of at least a portion of the pseudo-random sequence, and a rectifier connected to the output of said summing circuit.

3. The improved receiving circuit of claim 2, and further comprising:

a phase detector connected to receive the output of said rectifier and to receive a periodically occurring pulse from the pseudo random generator during each pseudo-random sequence and responsive thereto to produce an output control voltage dependent on the phase position of the two signals, the pseudo-random generator including a voltage controlled oscillator connected to receive and have its frequency controlled by the output control voltage.

4. The improved receiving circuit of claim 3, wherein said delay line comprises an acoustic surface wave delay line.

5. The improved receiving circuit of claim 3, wherein said demodulator is further defined as comprising:

a first mixer connected to receive the signal output of the phase-shift keying element and to receive a constant frequency unmodulated signal; and a second mixer connected to receive the entire signal and the output of said first mixer, said second mixer having an output connected to the correlation circuit.

6. The improved receiving circuit of claim 5, and further comprising:

first and second delay circuits connected to receive and feed the entire received signal and the only message modulated signal to said first and second mixers to equalize the transit times of those signals.

7. The improved receiving circuit of claim 6, and further comprising:

an inteference-suppression band pass filter connected between the phase-shift keying element and said first delay circuit.

* * * * *